July 24, 1962   F. L. HORN   3,046,088
PROTACTINIUM EXTRACTION
Filed June 22, 1960
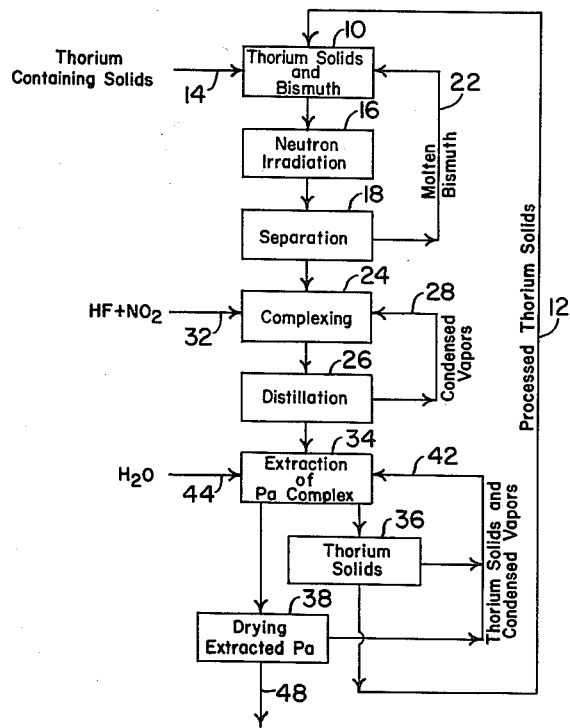
INVENTOR.
FREDERICK L. HORN Patented July 24, 1962

3,046,088
PROTACTINIUM EXTRACTION
Frederick L. Horn, Sayville, N.Y., assignor to the United States of America as represented by the United States Atomic Energy Commission
Filed June 22, 1960, Ser. No. 38,088
5 Claims. (Cl. 23—14.5)

This invention relates to the breeding of fissile fuels for use in nuclear fission reactors and more particularly relates to the recovery of protactinium from neutron irradiated thorium.

It has been forecast that the supply of fissile uranium, $U^{235}$, will become inadequate in the foreseeable future economically to provide for the anticipated requirements in the nuclear power field, and provision of an economic supply of the required fissile fuel will necessitate "breeding" by neutron irradiation of fertile material. It has also been forecast that the thorium isotope, $Th^{232}$, will prove to be economically superior to $U^{238}$ as a fertile raw material for the breeding of nuclear fuel.

Theoretical and other studies of proposed methods for achieving a satisfactory breeding ratio with thorium indicate promise for the use of thorium dispersed or dissolved in a fluid carrier. The thorium can thus be exposed readily to a controlled neutron irradiation flux and then processed to separate the products resulting from neutron capture. Conceivably, the products could be separated as thorium-233, protactinium-233 or uranium-233. In a process of the type proposed, it appears most advantageous to extract protactinium, $Pa^{233}$, instead of $U^{233}$ because of the resultant ease in handling and economy of processing. The 27.4 day half-life $Pa^{233}$ converts to fissile $U^{233}$ by beta decay which can be separated from the protactinium, if desired, by well known volatility processes after suitable treatment, as with bromine trifluoride.

In a certain breeder blanket system, it has been proposed to carry thorium tetrafluoride or thorium dioxide as a solid particulate dispersion in a suitable molten metal system because of the ease of separation of the molten metal fromt he solid thorium containing compound after irradiation. The success of this proposed method of using thorium for breeding is predicated upon the availability of an economical chemical method for the extraction of the protactinium from the irradiated thorium containing solid. Heretofore, there has been no known method for accomplishing the desired chemical extraction of protactinium short of complete dissolution of the thorium containing solids.

A particular object of this invention is to provide a new and novel chemical method for the extraction of protactinium from neutron irradiated thorium tetrafluoride and thorium dioxide. A further object of this invention is to provide a chemical method for the extraction of protactinium from neutron irradiated thorium tetrafluoride and thorium dioxide without complete dissolution of the thorium-containing solids. A still further object of this invention is to provide a chemical method for the extraction of protactinium from neutron irradiated thorium-containing solids which will permit further irradiation of the thorium-containing solids after extraction of the protactinium. A still further object of this invention is to provide a method whereby a substantial portion of the protactinium formed by neutral irradiation of thorium-containing solids can be recovered in a cyclical process.

According to the present invention, therefore, in the breeding of $U^{233}$ fissile nuclear fuel by neutron irradiation of thorium-232, protactinium, a precursor of $U^{233}$, can be isolated conveniently by a new and novel process which comprises the steps of exposing to neutron irradiation finely divided particulate thorium-containing solids, as the dioxide or tetrafluoride, contacting the irradiatied thorium-containing solids with a nonaqueous medium containing an acid fluoride and a complexing agent at an elevated temperature to render the protactinium extractable without appreciably affecting the thorium solids, separating the so contacted solids from the bulk of the nonaqeuous medium and recovering protactinium in a soluble form. In this process the protactinium formed by the neutron irradiation and subsequent nonaqueous treatment is soluble in the nonaqueous medium and is soluble also in water or aqueous acid solutions. Thus, the solids can be extracted with water or aqueous acid solution to recover protactinium after irradiation, treatment with the nonaqueous solution, and separation therefrom. The protactinium which is extracted into the nonaqueous solution or water or acid solution can be recovered by evaporating to dryness. The protactinium, thus isolated, can be further processed in the dry state or can be dissolved in a suitable aqueous or nonaqueous medium for further processing as desired.

Whereas it has been observed that the protactinium formed by the neutron irradiation of thorium tetrafluoride or thorium dioxide is essentially insoluble in most reagents and is not soluble to any appreciable extent in anhydrous acid fluorides such as hydrogen fluoride (HF) and difluorophosphoric acid ($HPO_2F_2$), it has been discovered that protactinium tetrafluoride is rendered at least partially soluble by treatment with these acid fluorides by the addition thereto of a complexing agent such as nitrogen dioxide. The exact mechanism of the reaction is unknown, but it is hypothesized that a complex of protactinium tetrafluoride and nitrogen dioxide is formed, and the complex has appreciable solubility in the anhydrous acid fluoride plus complexing agent, and other nonaqueous halogen containing solutions as well as in water and in aqueous acid solutions.

For a full and more complete understanding of the invention reference may be made to the following description and accompanying drawing. This drawing is a block diagram flowsheet which illustrates but does not limit the practice of this invention, and 10 represents an initial step in a process wherein dry finely divided particulate solid thorium tetrafluoride having a particle size distribution in the range of 0.5 micron to 1.5 microns is dispersed in molten bismuth, as by agitation with a suitable high-shear fluid-solid mixing device. The thorium tetrafluoride dispersed in 10 consists in part, of thorium tetrafluoride solids 12 which have been irradiated and subjected to the protactinium extraction process at least once, and in part of virgin thorium tetrafluoride 14 which is added to the system as make-up for the thorium tetrafluoride which has been removed from the system as protactinium.

The molten bismuth 22 used as the dispersal medium in 10 is recycled from a subsequent step 18.

The dispersion of thorium tetrafluoride in molten bismuth having a concentration by weight of about 10 percent thorium tetrafluoride is subjected to neutron irradiation in 16 under controlled conditions of time and neutron flux in order to limit possible side reactions such as the n, 2n reaction which form thorium-228 and decrease the yield of fissile product. The total irradiation to thermal neutrons in this step is closely controlled to about $3 \times 10^{15}$ nvt per gram of thorium tetrafluoride, which irradiation exposure is sufficient to cause the formation of about $10^6$ microcuries of protactinium per gram of irradiated thorium tetrafluoride.

The dispersion of thorium tetrafluoride in molten bismuth is caused to flow through suitable channels in a neutronic reactor at a rate such that it traverses a zone where it is irradiated with thermal neutrons at a flux intensity of $10^{13}$ n/sq. cm. sec. during a 5 minute exposure period. The flowing stream is then caused to leave the irradiation zone and is separated into its solid and liquid components in step 18 by conventional phase separation methods which can include filtration, centrifugation, and distillation. The liquid stream 22 is returned to step 10 and the solids substantially free of bismuth, are transferred to step 24 by conventional solids transporting equipment such as screw conveyors. In step 24 the solids are caused to contact a liquid consisting of 75 mol percent HF and 25 mol percent $NO_2$ at a temperature of 100–115° C. for at least 10 minutes to condition the solids for extraction of the bred protactinium contained therein. After this treatment, the liquid and solids are transferred to step 26 as a slurry of about 10 percent solids in the liquid. In step 26 the solids are separated from the liquid by evaporation to dryness in conventional distillation type equipment. The vapors are condensed and the distillate 28 is returned to step 24. Makeup HF and $NO_2$, in the necessary proportions to maintain the composition of the treatment solution as above described, is added through conduit 32 to the liquid in step 24 to replace the liquid components which are consumed in step 24 during the formation of what is believed to be a complex of protactinium tetrafluoride and nitrogen dioxide. The solids from step 26, substantially freed from the nonaqueous treatment solution, are transferred to an aqueous extraction step 34 by conventional solids transport equipment such as screw conveyors. In 34, the protactinium complex which is water soluble is extracted from the solids in a conventional countercurrent solid liquid contactor at ambient temperature. The solids from step 34 are conveyed in conventional equipment to a drying step 36 as a wet magma or pulp, and there dried in a conventional dryer of the type used to prevent caking and agglomeration. The dried solids 12 from 36 are returned to step 10 using conventional solids conveying equipment. The liquid extract from 34, containing the extracted protactinium in solution is evaporated to dryness in a suitable dryer 38, and the solids 48 are available as the product of this process. The water evaporated in drying steps 36 and 38 is condensed and returned to the extraction step 34 in stream 42. Additional water 44 is added to 34, as may be required, to make up losses from the system.

In the equipment associated with steps 10, 16 and 18, in which molten bismuth is handled, it is essential to exclude air and moisture to prevent oxidation of the bismuth. An inert atmosphere of helium or argon is conventionally used in such systems.

The equipment in which molten bismuth is handled can be fabricated of 2¼% chromium–1% molybdenum steel which has been pretreated to cause the formation of a zirconium nitride layer on the surfaces in contact with the molten bismuth to resist mass transfer corrosion. Additionally, a concentration of about 200 parts per million of zirconium can be maintained in the molten bismuth to preserve the integrity of the corrosion-resistant surface layer.

The equipment for steps 24 and 26 can be fabricated of Monel or Inconel which exhibit satisfactory corrosion resistance to the hydrogen fluoride nitrogen dioxide solution used for treating the irradiated thorium tetrafluoride. Alternatively, polytetrafluoroethylene or monochlorotrifluoroethylene plastic which is inert to the treating solution can be used as a lining to protect surfaces exposed to the solution or its vapors.

Corrosion is not a problem in steps 34, 36 and 38 and materials of construction conventionally used in equipment for the processing of aqueous systems of radioactive materials can be employed.

In an alernate embodiment, not shown, the process flowsheet of FIGURE 1 is modified to provide a phase separation step after treatment step 24 of FIGURE 1 to segregate the solids and the nonaqueous treatment solution. The latter can be recycled to treatment step 24 and the former can be evaporated to dryness as in step 26. This embodiment reduces the quantity of nonaqueous solution which must be evaporated and condensed and can result in lower capital investment and lower operating costs.

In another alternate embodiment, not shown, a phase separation step is provided after step 24 as before. However, in this instance the segregated solvent is evaporated to dryness providing a source of dry protactinium which has not been brought into contact with water, as may be required or desired for certain use.

In a still further alternate embodiment, not shown, an additional extraction step can be inserted after aqueous extraction step 34 and before drying steps 36 and 38. In this additional extraction step nitric acid can be used for further extraction of protactinium.

It is obvious to one skilled in the art that combinations of all these embodiments can be used as desired where economics or other considerations dictate. The illustrated embodiment serves only to typify and emphasize the essential characteristics of this invention.

Whereas the foregoing described and illustrated embodiments are particularly adaptable to use with power generation type nuclear reactors in which a high reactor temperature level is desirable to improve the thermodynamic efficiency of power extraction, the use of a molten metal carrier for the thorium containing fertile blanket material is neither necessary nor desirable when breeding is to take place in an air-cooled or water-cooled nuclear reactor. Thus, in another embodiment of this invention, which is particularly adaptable to use with air-cooled or water-cooled nuclear reactors, a molten metal carrier for the thorium-containing solids is not used. Instead, the nonaqueous treatment solution which solubilizes and extracts the protactinium is used as the carrier for the dispersed thorium-containing solids. In still another embodiment of this invention, it is not necessary to remove the thorium-containing solids from the irradiation flux in order to recover the protactinium which results from neutron capture and beta decay. The thorium-containing material, in the form of particulate solids having a mean diameter of about one micron, can be retained in the irradiation flux of neutrons in a stable settled or fluidized bed while the solids are continuously bathed with a moving stream of the anhydrous treatment solution of this invention. Because the treatment solution is continuously washing the solids, the protactinium formed as a consequence of neutron capture and beta decay is continuously extracted into the nonaqueous treatment solution which can be continuously removed and replenished at a rate sufficient to effect substantially complete removal of all the protactinium as it is formed and solubilized. After removal from the nuclear reactor, the protactinium contained in the nonaqueous solution can be separated by evaporation of the solvent as previously disclosed. The solvent can be recovered substantially free from protactinium and other nonvolatile products by condensation, and then recycled to the protactinium extraction. Additional thorium-containing solids can be added, as required, as replacement for the thorium converted to protactinium and removed from the breeder blanket.

This particular embodiment of the invention is most useful with nuclear reactors in which the temperature of the breeder blanket zone can be maintained at a level which will permit the nonaqueous treatment solution to be substantially in the liquid phase at a reasonable low pressure. A suitable set of temperature and pressure conditions for satisfactory operation of this embodiment of the invention is 80° C. and 80 p.s.i.a., although higher temperatures with necessarily higher pressures can be employed when suitable nonaqueous liquid-containing piping having the requisite strength to contain the resultant higher operating pressures is provided.

A particular advantage of the embodiments which utilize the non-aqueous treatment solution in the breeder blanket of the nuclear reactor is that the nonaqueous solution itself can serve as a moderator in the breeder blanket because of its preponderance of low molecular weight species having low neutron capture cross sections. A nonaqueous solution of 20 mol percent nitrogen dioxide and 80 mol percent hydrogen fluoride has a cross section for neutron capture of about one-half barn. The major effect of neutron capture on the nonaqueous solution would be to form carbon 14 from nitrogen 14 by an n-p reaction. The resultant carbon 14 has a low neutron cross section and in any event is both volatile and readily separable from the nonaqueous solution as carbon dioxide which is the compound in which the carbon will be present under these conditions of formation.

Suitable container materials for the breeder blankets of these embodiments which employ the nonaqueous solution in the reactor, include cobalt-free nickel and cobalt-free nickel alloys. Nickel exhibits satisfactory corrosion resistance, and, when cobalt-free, has a neutron cross section of about 4.6 barns which is not too great to preclude its use in this application.

The following examples will illustrate the effectiveness of my new and novel chemical method for the extraction of protactinium from neutron irradiated thorium tetrafluoride and thorium dioxide. These examples are intended for illustration only and are in no way intended to limit the scope of the invention.

EXAMPLE I

One gram of thorium tetrafluoride powder having a particle size on the order of one micron was exposed for five minutes in a neutronic reactor to a neutron flux of $10^{13}$ neutrons/sq. cm./sec. The irradiated salt was contacted with a solution consisting of 11 mol percent $NO_2$, 26 mol percent $BrF_3$ and 63 mol percent HF. Sixteen milliliters of the solution were added to the one gram of solids in a Monel tube which was then maintained at 121° C. for a period of two hours. At the end of the two-hour period, the contents of the Monel tube were transferred to a monochlorotrifluoroethylene test tube for visual observation. The salt appeared to have increased in volume by about a factor of two and exhibited a slower settling rate than prior to treatment.

The supernatent liquid was decanted and monitored with a Geiger-Müller tube. The activity was found to be three times background. An aliquot portion of the liquid upon evaporation to dryness had an activity of $2.4 \times 10^6$ disintegrations per minute per milliliter. Based on this activity, the liquid phase contained approximately 10% of the activity originally present in the irradiated solids.

A first approximation of the half-life for the activity extracted into the solution was 28.7 days, which compared favorably with the known 27.4 day half-life of protactinium.

This example shows that protactinium can be extracted from irradiated thorium tetrafluoride by treatment with a solution containing an acid fluoride (HF) and a complexing agent ($NO_2$).

EXAMPLE II

A one gram sample of thorium tetrafluoride powder, as in Example I was irradiated for five minutes in a $10^{13}$ neutrons/sq. cm./sec. neutron flux and was later contacted with a nonaqueous treatment solution having the same composition as in Example I. The treatment conditions were 3 hours at 170° C. Because of experimental difficulties the results of the first treatment were discounted although it was determined that the weight of the salt increased a minimum of 16%.

The treated salt was centrifuged and again treated for three hours at 170° C. with a fresh solution having the same composition as before. The solids were separated by centrifugation and a sample of the liquid was counted in a gamma scintillation well counter having a 52% geometry for $Pa^{233}$. Computations showed that 15% of the original activity was present in the liquid. Washing the solids with $BrF_3$ removed an additional 0.8% of the original activity.

The salts were again treated with a fresh $$NO_2\text{---}BrF_3\text{---}HF$$

solution of the original composition and an additional 14% of the activity remaining in the salt was extracted. Subsequent washes with $BrF_3$ removed another 2.3% of the remaining activity.

This example shows that repeated treatments with the nonaqueous solution result in the extraction of additional activity and that such treatments leave a residual activity which is at least partially extractable with $BrF_3$. These results further indicate that the extraction of protactinium by the nonaqeuous solution may be limited by a solubility effect.

EXAMPLE III

A sample of thorium tetrafluoride powder irradiated as in Example I was contacted with a nonaqueous treatment solution consisting of 12 mol percent $NO_2$, 26 mol percent $BrF_3$ and 62 mol percent HF for five hours at 177° C. A sample of the decanted and centrifuged solution had an activity which indicated that 12% of the protactinium activity had been extracted. When this solution was evaporated to dryness, it was found that substantially all of the activity remained behind with the solids and no activity was found in the condensate.

This example shows that the extracted form of the protactinium is not volatile to any extent.

EXAMPLE IV

The thorium tetrafluoride solids of Example III which were separated from the treatment solution by decantation and centrifugation were then contacted with $BrF_3$ for five hours at 160° C. Essentially no activity was extracted. These same solids were then contacted with HF for five hours at 70° C., and again no activity was extracted.

After the unsuccessful attempted extraction of activity with the HF, the solids were contacted for three hours at 90° C. with a nonaqueous solution of HF and $NO_2$ having the composition 84 mol percent HF and 16 mol percent $NO_2$.

Measurement of the activitiy in the liquid indicated that 14% of the protactinium activity was extracted from the solids. This solution was allowed to contact the solids for an additional 7 hours at 90° C. The activity in solution showed a negligible increase.

This example shows that neither $BrF_3$ nor HF, alone, are active extractants for the protactinium bred in thorium tetrafluoride and that a mixture of HF and $NO_2$ is required to treat the protactinium to make it extractable. A further implication of this work is that the extracted protactinium has a limited solubility in the HF—$NO_2$ treatment solution.

EXAMPLE V

A one gram sample of unirradiated thorium tetrafluoride as used in Example I was contacted with a solution of $NO_2$—$BrF_3$—HF, as used in Example I, for several hours at a temperature of 100 to 125° C. The hot solution was decanted, cooled to room temperature and centrifuged. The clear solution after being centrifuged was evaporated to dryness and the residue weighed. A blank was run on the solution. The weight of residue after drying was found to be substantially the same for both the blank and the solution exposed to the thorium tetrafluoride indicating that there is no appreciable thorium solubility in this nonaqueous solution at room temperature.

EXAMPLE VI

A one gram sample of powdered thorium tetrafluoride irradiated as in the previous examples was treated with 20 milliliters of a solution consisting of 23 mol percent $NO_2$ and 77 mol percent HF at temperatures in the range 100–115° C. for various periods of time ranging from 25 to 60 minutes. After each contact period the solution was decanted, evaporated to dryness, the vapors condensed, collected, and recycled to recontact the solids. A Monel contact vessel and evaporator were used in conjunction with a monochlorotrifluoroethylene condenser and a monochlorotrifluoroethylene 3-micron porous filter in the line connecting the contact vessel and evaporator. The filter was used to prevent the transfer of solids during the decanting operation. The contacting, decanting, evaporation, and condensing operations were repeated for a total of 14 cycles and the rate of transfer of protactinium activity was monitored with a radiation survey meter held about one inch from the outside surface of the evaporator. The activity level increased from a background reading of 0.01 mr./hr. to 0.50 mr./hr. in the 14 cycles as shown in Table I.

Table I

EXTRACTION OF PROTACTINIUM FROM IRRADIATED THORIUM TETRAFLUORIDE

| Contact No. | Radiation Level in Evaporator, mr./hour | Contact Time, minutes |
| --- | --- | --- |
| 1 | 0.01 (background) | 0 |
| 2 | 0.05 | 35 |
| 3 | 0.07 | 50 |
| 4 | 0.09 | 45 |
| 5 | 0.12 | 60 |
| 6 | 0.15 | 60 |
| 7 | 0.18 | 40 |
| 8 | 0.20 | 25 |
| 9 | 0.25 | 45 |
| 10 | 0.35 | 35 |
| 11 | 0.40 | 30 |
| 12 | 0.42 | 30 |
| 13 | 0.45 | 35 |
| 14 | 0.50 | 40 |

During the fourteen cycles the radiation level in the condenser did not increase above background.

The original amount of protactinium in the sample, estimated from radiation measurements, was 106 microcuries. The final amount was 77 microcuries. Thirty-four microcuries were found in the evaporator indicating internal consistency in the measurements.

This example shows that a solution of HF and $NO_2$ can be used in a closed cycle to treat and extract protactinium from irradiated thorium tetrafluoride and that the solution can be evaporated and condensed without volatilization of protactinium.

EXAMPLE VII

Example VI was substantially duplicated using 10 milliliter washes of a solution of 27 mol percent $NO_2$ and 73 mol percent HF for 16 cycles with a contact temperature range of 110°–160° C. and contact times of 10 to 45 minutes. More than 32% of the protactinium activity was extracted.

This example shows that it is possible to use smaller quantities of nonaqueous contact solution as well as shorter contact times and higher contact temperatures.

EXAMPLE VIII

One gram of micron size thorium tetrafluoride powder was sealed in a polytetrafluoroethylene cylinder ¼ inch inside diameter by 1¼ inches long having ends of monochlorotrifluoroethylene filter material with ten-micron pores. This capsule and its contents was subjected to a five minute irradiation in a neutron flux of $1.5 \times 10^{13}$ neutrons/sq. cm./sec. The neutron irradiation produced about $10^9$ disintegrations per minute protactinium activity. After irradiation the capsule was contacted with a nonaqueous treatment solution having the composition 26 mol percent $NO_2$, 70 mol percent HF, and 6 mol percent $BrF_3$ for 19 separate half-hour periods at temperatures in the range of 80 to 127° C. After each contact period the solution was transferred to an evaporator and evaporator to dryness. The vapors were condensed, collected and used in the next contact. At the completion of the 19th contact and evaporation, the residue in the evaporator was dissolved in 10% hydrochloric acid solution, the solution was centrifuged and a sample of the clear solution was counted. Eight percent of the original protactinium activity was found in the evaporator.

The capsule and contents were dried to constant weight and several additional contact cycles were made. An additional 3.3% of the protactinium activity was found in the evaporator. After redrying, the capsule and contents were immersed in water at 93° C. for six hours but only a small amount of activity was extracted. The capsule was left immersed overnight and then maintained at 100° C. for eight hours. Measurement of the activity of the water showed that 78.4% of the proctactinium was extracted by this procedure. An additional three hour extraction with 100° C. water removed 3.1% more protactinium.

The capsule was opened and the solids extracted with 50% aqueous nitric acid solution. An additional 7.2% of the original protactinium was found in the acid solution.

The treatments and yields of protactinium are summarized in Table II.

Table II

PROTACTINUM ESTRACTION WITH WATER FOLLOWING NONAQUEOUS TREATMENT

| Extraction Cycles Using Nonaqueous Solution | Contact Time Per Cycle Hour | Temperature, ° C. | Yield, Percent |
| --- | --- | --- | --- |
| Cycles: | | | |
| 19 | 0.5 | 80–127 | 8.0 |
| 16 | 0.5 | 102 | 1.1 |
| 13 | 0.5 | 96 | 1.3 |
| 13 | 0.5 | 107 | 0.5 |
| 12 | 0.5 | 99 | 0.4 |
| Nonaqueous extraction Subtotal | | | 11.3 |
| Extraction with Water | 6 | 93 | 0.1 |
| Extraction with Water | 8 | 100 | 78.4 |
| Extraction with Water | 3 | 100 | 3.1 |
| Water extraction Subtotal | | | 81.6 |
| Extraction with 50% $HNO_3$ | | | 7.2 |
| Total protactinium extracted | | | 100.1 |

Interpretation of the results of this sequence of operations leads to the conclusion that treatment of irradiated thorium tetrafluoride with nonaqueous solution containing $NO_2$ and HF permits the extraction of substantially all of the protactinium activity when the nonaqueous treatment is followed by a suitable extraction with water or nitric acid solution. Apparently the confinement of the irradiated thorium tetrafluoride in the capsule limited the rate of extraction to that controlled by the solubility in the extractant and its diffusion through the pores of the end caps of the capsule.

EXAMPLE IX

To test the effect of nonaqueous treatment of thorium tetrafluoride before irradiation on the subsequent extraction of protactinium, three one gram samples of thorium tetrafluoride were encapsulated as in Example VIII. One capsule was subjected to treatment in a $NO_2$—HF solution prior to irradiation, one capsule was subjected to a similar treatment after irradiation, and the third capsule was irradiated without prior or post treatment with the $NO_2$—HF solution.

All three samples were given a water extraction followed by an extraction with nitric acid. Finally all three samples were dissolved in boiling nitric acid. The extract solutions were counted to determine the amount of protactinium recovered. The activity found in the boiling nitric acid was considered to be residual, nonrecovered protactinium. The results of these operations are summarized in Table III.

Table III

PROTACTINIUM EXTRACTION IN WATER—EFFECT OF NONAQUEOUS TREATMENT BEFORE OR AFTER IRRADIATION

| Sample Treatment | Percent Protactinium Recovery | | |
|---|---|---|---|
| | $H_2O$ | $HNO_3$ | Total Recovery |
| After Irradiation | 22 | 28 | 50 |
| Before Irradiation | 8 | 3 | 11 |
| No Treatment | 0 | 18 | 18 |

The equivalent protactinium activity in a sample of thorium tetrafluoride which has not been irradiated was determined at the same time and found to be less than one-tenth percent of that in the irradiated thorium tetrafluoride samples.

This example shows that treatment with a nonaqueous solution containing $NO_2$ and HF is a necessary prelude to the aqueous extraction of protactinium from irradiated thorium tetrafluoride and that treatment after irradiation results in higher yield of extracted protactinium than treatment before irradiation.

EXAMPLE X

A one gram sample of ultra pure thorium dioxide powder which had a particle size range of 0.1 to 2 microns and which had been calcined at 800° C. during manufacture was encapsulated in a cylinder having porous end caps as described in Example VIII and subjected to a 30 minute irradiation in a neutron flux of $1 \times 10^{13}$ neutrons/sq. cm./sec. After irradiation the capsule was contacted with a nonaqueous treatment solution having the composition 25 mol percent $NO_2$, 75 mol percent HF at 80° C. for varying periods from ½ to 2 hours. After each contact period the solution was transferred to an evaporator and evaporated to dryness. The vapors were condensed, collected, and used in the next contact. The activity in the contact solution prior to evaporation averaged $0.5 \times 10^6$ disintgrations per minute per milliliter. The condensate had substantially no activity.

A total of 60 contact cycles during a 23 day period removed $2.4 \times 10^8$ disintegrations per minute, or 12 percent of the protactinium activity. Half of this activity was removed during the first seven days.

This example shows the protactinium can be extracted from irradiated thorium dioxide by treatment with a nonaqueous solution of this invention.

EXAMPLE XI

A ten gram sample of the thorium dioxide as used in Example X was irradiated for 30 minutes in a neutron flux of $1 \times 10^{13}$ neutrons/sq. cm./sec. and contacted with a nonaqueous solution of 13 mol percent $NO_2$, 87 mol percent HF for ½ hour at 80° C. The contact solution was centrifuged to separate entrained solids and the activity determined. The activity of the solution was found to be $3.22 \times 10^6$ disintegrations per minute per milliliter, or about six times the concentration of protactinium obtained in Example X.

This example shows that the amount of protactinium extracted in the examples using encapsulated thorium-containing solids was not limited by protactinium solubility in the treatment solution that was probably limited by the diffusion of the treatment solution through the porous end caps of the sample capsule.

Taken in their entirety, all these examples demonstrate the utility of this invention for the extraction of protactinium from irradiated thorium tetrafluoride and thorium dioxide by means of a nonaqueous treatment solution containing 11 to 27 mol percent $NO_2$, 62 to 84 mol percent HF and 0 to 26 mol percent $BrF_3$.

As disclosed in copending United States patent application, S.N. 804,553, dated April 6, 1959, issued as U.S. Patent No. 3,012,849, dated December 12, 1961, solutions of substantially this same composition will dissolve uranium. Therefore, any uranium-233 which forms in the irradiated thorium-containing solids as a consequence of decay of the 27.5 day half-life protactinium-233 will be extracted also. Because of the long half-life uranium-233, $1.6 \times 10^5$ years, and since uranium-233 is an alpha emitter, the amount of uranium-233 extracted with the protactinium in these examples was not determined.

Although this discosure has been concerned with the recovery of protactinium from irradiated thorium tetrafluoride and irradiated thorium dioxide, it is obvious to one skilled in the art that this invention will be equally useful in the extraction of protactinium from other forms of irradiated thorium since exposure of the protactinium source to the nonaqueous treatment solution will convert a portion of the exposed thorium to thorium tetrafluoride or some complex of fluoride and $NO_2$. Since this invention is concerned with a cyclical process, the repeated exposure of the protactinium source material to the nonaqueous treatment solution will eventually result in the conversion of a substantial portion of the thorium to tetrafluoride and complex fluoride. For this reason, forms of thorium other than thorium tetrafluoride and thorium dioxide are equally amenable to the process of this invention. Also, because of the repeated irradiation and extraction cycle, the particles of thorium-containing solid will tend to become more porous with time. Since the amount of protactinium which is extractable by the process of this invention appears to be limited by the accessibility of the nonaqueous treatment solution to the site of the protactinium in the solid particle matrix, an increase in particle porosity with time should also result in a concomitant increase in the protactinium recovery.

Since many embodiments might be made in the present invention, and since many changes might be made in the embodiment described, it is to be understood that the foregoing description is to be interpreted as illustrative only and not in a limiting sense.

I claim:

1. A method for the production and extraction of protactinium consisting of exposing thorium-containing solids dispersed in molten liquid bismuth to irradiation from a neutron irradiation to form protactinium by neutron capture and beta decay, contacting the said irradiated thorium-containing solids with a non-aqueous liquid medium consisting of hydrogen fluoride and nitrogen dioxide at elevated temperature to form a protactinium complex in said non-aqueous solution, distilling off non-aqueous liquid medium, separating the said protactinium complex from said solids by contacting said solids with an aqueous liquid solvent and thereafter drying said solids for reuse in the process.

2. A method for the production and extraction of protactinium from thorium-containing solids comprising exposing said thorium-containing solids to neutron irradiation to form protactinium by neutron capture and beta decay, contacting said irradiated solids containing the thus formed protactinium with a non-aqueous liquid medium at elevated temperatures consisting of hydrogen fluoride and nitrogen dioxide and forming a soluble protactinium complex, removing the non-aqueous solution by distillation to retain the protactinium complex with the irradiated solids, contacting said irradiated solids containing said complex with an aqueous solution to remove said complex, thereafter drying said solids for reuse in the process.

3. The method according to claim 2, wherein thorium-containing solids are thorium dioxide.

4. The method according to claim 2, wherein the thorium-containing solids are thorium-tetrafluoride.

5. In a method of separating protactinium from thorium-containing solids, the improvement which comprises the formation of a water soluble complex of protactinium by contacting said protactinium and thorium-containing solids with a non-aqueous solution consisting essentially of 11–27 mol percent $NO_2$, 62 to 84 mol percent HF and 0 to 26 mol percent $BrF_3$ at a temperature in the range of from 100 to 115° C. for about 10 minutes.

References Cited in the file of this patent

UNITED STATES PATENTS

| | | |
|---|---|---|
| 2,546,933 | Steahly et al | Mar. 27, 1951 |
| 2,811,413 | McMillan | Oct. 29, 1957 |
| 2,887,357 | Seaborg et al. | May 19, 1959 |
| 2,893,936 | Hatch et al. | July 7, 1959 |

OTHER REFERENCES

Katz et al.: "The Chemistry of the Actinide Elements," pp. 90, 91, John Wiley and Sons, NYC., 1957. (Copy in Patent Office Science Library.)

TID–7534, Book 2, pp. 560–573, May 20–25, 1957. (Copy in Patent Office Science Library.)

BNL–571, pp 25–31, Jan. 1–April 30, 1959. (Copy in Div. 46.)